United States Patent [19]

Mark

[11] 4,039,509

[45] * Aug. 2, 1977

[54] NON-OPAQUE FLAME RETARDANT POLYCARBONATE COMPOSITION

[75] Inventor: Victor Mark, Evansville, Ind.

[73] Assignee: General Electric Company, Pittsfield, Mass.

[*] Notice: The portion of the term of this patent subsequent to Nov. 11, 1992, has been disclaimed.

[21] Appl. No.: 626,934

[22] Filed: Oct. 29, 1975

Related U.S. Application Data

[63] Continuation-in-part of Ser. No. 429,166, Dec. 28, 1973, Pat. No. 3,919,167.

[51] Int. Cl.² .............................................. C08L 69/00
[52] U.S. Cl. ...................... 260/45.8 R; 260/45.8 RB; 260/45.8 RW; 260/45.8 A; 260/45.8 N; 260/45.8 NW; 260/45.8 NT; 260/45.8 NZ; 260/45.8 SN

[58] Field of Search .................. 260/45.8 R, 45.8 RB, 260/45.8 RW, 45.8 A, 45.8 N, 45.8 NW, 45.8 NT, 45.8 NZ, 45.8 SN

[56] References Cited

U.S. PATENT DOCUMENTS

| | | | |
|---|---|---|---|
| 3,535,300 | 10/1970 | Gable | 260/45.8 SN |
| 3,775,367 | 11/1973 | Nouvertne | 260/45.9 R |
| 3,919,167 | 11/1975 | Mark | 260/45.8 N |

*Primary Examiner*—M. J. Welsh
*Attorney, Agent, or Firm*—William F. Mufatti

[57] ABSTRACT

A non-opaque flame retardant polycarbonate composition comprising in admixture an aromatic carbonate polymer and an additive which may be the metal salts of heterocyclic sulfonic acids; said aromatic carbonate polymer and additive having a refractive index in the range of 1.54 to 1.65.

12 Claims, No Drawings

NON-OPAQUE FLAME RETARDANT POLYCARBONATE COMPOSITION

This application is a continuation-in-part of Patent application Ser. No. 429,166 filed Dec. 28, 1973, now U.S. Pat. No. 3,919,167, issued Nov. 11, 1975.

This invention is directed to a non-opaque flame retardant polycarbonate composition and in particular an aromatic polycarbonate containing in admixture therewith an additive which may be the metal salts of sulfonic acids of heterocyclic compounds or mixtures of these wherein said aromatic polycarbonate and additive have a refractive index in the range of 1.54 to 1.65 and articles therefrom.

BACKGROUND OF THE INVENTION

With the increasing concern for safety, there is a positive move towards providing safe materials for public and household use. One particular area of need is that of providing flame resistant or flame retardant non-opaque products for use by the ultimate consumer. As a result of this demand, many non-opaque products are being required to meet certain flame retardant criteris both by local and federal government and the manufacturers of such products. One particular set of conditions employed as a measuring standard for flame retardancy is set forth in Underwriters' Laboratories, Inc. Bulletin 94. This Bulletin sets forth certain conditions by which materials are rated for self-extinguishing characteristics.

In the art, there are many known flame retardant additives which are employed by mixing with products to render such materials self-extinguishing or flame retardant. Such flame retardant additives have been known to be employed in amounts of 5 to 20 weight percent in order to be effective in extinguishing burning of those products which are combustible. It has also been found that such amounts can have a degrading effect upon the base product to be rendered flame retardant, resulting in the losses of valuable physical properties of the base product. This is particularly so when employing known flame retardant additives with the base product polycarbonate resins. Many of these known additives have a degrading effect upon the polymer.

In many instances, it is desirable that articles produced from these fire retardant polycarbonate resins retain their non-opaque characteristics.

DESCRIPTION OF THE INVENTION

It has now been surprisingly discovered that an aromatic polycarbonate can be made flame retardant while retaining its non-opaque characteristics by incorporating with the aromatic polycarbonate 0.001 to about 2.0 parts per hundred parts of aromatic polycarbonate of certain additives, which additives are inert, do not degrade the aromatic polycarbonate and also retain the non-opaque character of the polycarbonate composition.

The shaped article of the present invention is that comprising an aromatic carbonate polymer and from 0.001 to about 2.0 parts per hundred parts of aromatic carbonate polymer of an additive selected from the group consisting of the metal salts of substituted and unsubstituted sulfonic acids of heterocyclic compounds, and mixtures thereof, wherein said metal salts thereof are selected from the group consisting of alkali metals and alkaline earth metals, and mixtures of the metal salts, and wherein said substituent on the metal salt of the substituted sulfonic acids of heterocyclic compounds is selected from the group consisting of an electron withdrawing radical and mixtures of electron withdrawing radicals; and wherein said heterocyclic compound is selected from the group consisting of five and six membered heterocyclic nuclei containing a hetero atom selected from the group consisting of nitrogen, oxygen and sulfur wherein the shaped article has a refractive index in the range of 1.54 to 1.65. Particularly preferred shaped articles are in the form of a sheet and a pellet.

The refractive indicies of the materials herein are determined by the immersion method as described in *Physical Methods of Organic Chemistry*, by Arnold Weissberger, Interscience Publishers, Volume II, 1960 (page 1433).

When the refractive index of the instant additives is in the range of the refractive index of the aromatic carbonate polymer, i.e., 1.54 to 1.65, the polycarbonate composition and shaped article produced therefrom is non-opaque. This means that it is able to transmit light and is from translucent to transparent. Depending upon how close the refractive index of the additive is to that of the polycarbonate, this will determine whether the resulting composition is transparent or translucent. If the additive at the concentration employed is partially or totally soluble in the polycarbonate polymer, the more transparent the composition and resulting article will be.

More specifically, the particular additive of this invention is the metal salt of substituted and unsubstituted sulfonic acid of heterocyclic compounds and includes mixtures of these having a refractive index in the range of 1.54 to 1.65. The metal salt employed in the practice of this invention is either the alkali metal or alkaline earth metal salt or mixtures of these metal salts. The metals of these groups are sodium, lithium, potassium, rubidium, cesium, beryllium, magnesium, calcium, strontium and barium.

The substituted sulfonic acid of heterocyclic compounds employed in the practice of this invention is one wherein the substituent is an electron withdrawing radical. As employed herein and within the scope of this invention, any of the electron withdrawing radicals can be employed in the practice of this invention. However, preferably, the electron withdrawing radical or substituent employed in the practice of this invention is the halo-, nitro-, trihalomethyl and cyano electron withdrawing radicals or mixtures of these electron withdrawing radicals.

The electron withdrawing phenomenon, or as it is also referred to as electronegativity, is defined in *Basic Principles of Organic Chemistry* by Roberts and Caserio, 1964 (pages 185–186), and *Physical Organic Chemistry* by Jack Hine, McGraw-Hill Book Company, Inc. 1962 (pages 5, 32 and 85–93). Briefly, the electron withdrawing phenomenon is where the radical has a strong affinity for a negative charge, namely electrons, but still remains covalent and does not form an ion. This is an extremely brief description of this phenomenon and is merely set forth here to describe the electron withdrawing effect. Reference should be made to the texts set forth above.

In the practice of this invention, the metal salts of the sulfonic acids of heterocyclic compounds having a refractive index in the range of 1.54 to 1.65 have the following formula:

wherein X is an electron withdrawing radical, M is a metal which may be selected from the periodic table of either an alkali metal or an alkaline earth metal and R is an organic nucleus selected from the group of organic heterocyclic nuclei consisting of A. 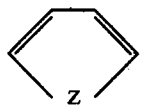

wherein Z is selected from the hetero atoms consisting of sulfur, oxygen and nitrogen, B. 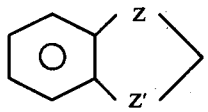

wherein Z and Z' are independently selected from the group consisting of carbon and the hetero atoms, nitrogen, sulfur and oxygen, providing that at least one Z is a hetero atom, C. 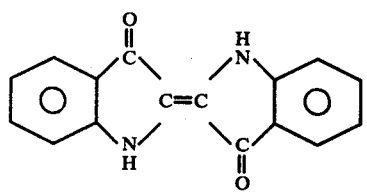

D. Phthalocyanine

E. 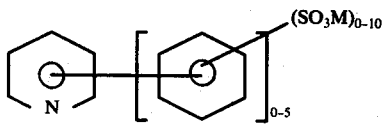

F. 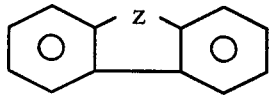

wherein
Z is selected from the hetero atoms consisting of nitrogen, oxygen and sulfur.

Also in Formula I above, X is an electron withdrawing radical and M is a metal which may be selected from the periodic table of either an alkali metal or an alkaline earth metal. Preferably, for optimum results, the electron withdrawing radical is substituted on the heterocyclic nucleus.

While there are many compounds that meet the requirements of Formula I and which offer excellent flame retardant characteristics to an aromatic polycarbonate, the preferred additive employed is the sodium salt of 2,5-dichlorothiophene-3-sulfonic acid.

The compositions of the instant invention may contain fillers, pigments, dyes, antioxidants, stabilizers, ultraviolet light absorbers, mold release agents and other additives commonly employed in non-opaque polycarbonate resin formulations. Furthermore, the shaped articles may be coated with, for example, mar or scratch-resistant coatings.

PREFERRED EMBODIMENT OF THE INVENTION

In order to more fully and clearly illustrate the present invention, the following specific examples are presented. It is intended that the examples be considered as illustrative rather than limiting the invention disclosed and claimed herein. In the examples, all parts and percentages are on a weight basis unless otherwise specified.

EXAMPLE 1

One hundred (100) parts of an aromatic polycarbonate, prepared by reacting 2,2-bis(4-hydroxyphenyl)propane and phosgene in the presence of an acid acceptor and a molecular weight regulator and having an intrinsic viscosity of 0.57 is mixed with 0.01 part of a finely ground dehydrated additive listed in Table I by tumbling the ingredients together in a laboratory tumbler. The resulting mixture is then fed to an extruder, which extruder is operated at about 265° C, and the extrudate is comminuted into pellets.

The pellets are then injection molded at about 315° C into test bars of about 5 in. by ½ in. by about 1/16-⅛ in. thick into test squares of about 2 in. by 2 in. by about ⅛ in. thick. The test bars (5 for each additive listed in the Table) are subject to the test procedure set forth in Underwriters' Laboratories, Inc. Bulletin UL-94, Burning Test for Classifying Materials. In accordance with this test procedure, materials so investigated are rated either V-O, V-I or V-II based on the results of 5 specimens. The criteria for each V (for vertical) rating per UL-94 is briefly as follows:

V-O: Average flaming and/or glowing after removal of the igniting flame shall not exceed 5 seconds and none of the specimens shall drip flaming particles which ignite absorbent cotton.

V-I: Average flaming and/or glowing after removal of the igniting flame shall not exceed 25 seconds and the glowing does not travel vertically for more than ⅛ of the specimen after flaming ceases and glowing is incapable of igniting absorbent cotton.

V-II: Average flaming and/or glowing after removal of the igniting flame shall not exceed 25 seconds and the specimens drip flaming particles which ignite absorbent cotton.

In addition, a test bar which continues to burn for more than 25 seconds after removal of the igniting flame is classified, not by UL-94, but by the standards of the instant invention, as "burns". Further, UL-94 requires that all test bars in each test group must meet the V type rating to achieve the particular classification. Otherwise, the 5 bars receive the rating of the worst single bar. For example, if one bar is classified as V-II and the other four (4) are classified as V-O, then the rating for all 5 bars is V-II.

The test squares are tested for light transmission in a Gardner XL 10-CDM instrument. The data shows the amount of incident light transmitted by the test squares using air as 100% transmission.

The results of the different additives within the scope of the instant invention are as follows with a control being the aromatic polycarbonate as prepared above without the additive of the type set forth herein.

TABLE 1

| Additive (0.01 parts per hundred) | Light Transmission (%) | Flame Out Time Seconds | No. of Drips Per five test bars | UL-94 Rating |
|---|---|---|---|---|
| CONTROL | 89 | 24 | 13 | Burning |
| Sodium 2,5-dichlorothiophene-3-sulfonate | 86 | 8.6 | 3 | V-O |
| Disodium indigo-5,5'-disulfonate | 76 | 8.6 | 2 | V-II |

EXAMPLE II

This Example is set forth to demonstrate the effect of the additives of this invention at limits of 0.05 parts per hundred parts of the polycarbonate.

In preparing the test specimens for this Example, 100.00 parts of the polycarbonate of Example I is mixed with 0.05 parts of the additives listed in Table 2 employing the same procedure. Test specimens are then molded using the same procedure employed in Example I. The test specimens are subjected to the same test procedure of Example I with the following results:

TABLE 2

| Additive (0.05 parts per hundred) | Light Transmission (%) | Flame Out Time Seconds | No. of Drips Per five test bars | UL-94 Rating |
|---|---|---|---|---|
| CONTROL | 86 | 26 | 13 | Burning |
| Calcium benzothiophene-2-sulfonate | 76 | 5.9 | 2 | V-II |
| Potassium dibenzofuran-3-sulfonate | 68 | 9.2 | 1 | V-II |

EXAMPLE III

This example is set forth to demonstrate the effect of the additives of this invention at limits of 0.10 parts per hundred parts of the polycarbonate.

In preparing the test specimens for this Example, 100.00 parts of the polycarbonate of Example I is mixed with 0.10 parts of the additives listed in Table 3 employing the same procedure. Test specimens are then molded using the same procedure employed in Example I. The test specimens are subjected to the same test procedure of Example I with the following results:

TABLE 3

| Additive (0.10 parts per hundred) | Light Transmission (%) | Flame Out Time Seconds | No. of Drips Per five test bars | UL-94 Rating |
|---|---|---|---|---|
| CONTROL | 86 | 26 | 13 | Burning |
| Sodium 2,5-dichlorothiophene-3-sulfonate | 84 | 5.6 | 0 | V-I |
| Potassium 2,3,5-tribromothiophene-4-sulfonate | 80 | 3.9 | 0 | V-O |
| Sodium pyridine-3-sulfonate | 60 | 6.7 | 2 | V-II |

EXAMPLE IV

This example is set forth to demonstrate the effect of an additive of this invention at limits of 0.20 parts per hundred parts of the polycarbonate.

In preparing the test specimens for this Example, 100.00 parts of the polycarbonate of Example I is mixed with 0.20 parts of the additive listed in Table 4 employing the same procedure. Test specimens are then molded using the same procedure employed in Example I. The test specimens are subjected to the same test procedure of Example I with the following results:

TABLE 4

| Additive (0.20 parts per hundred) | Light Transmission (%) | Flame Out Time Seconds | No. of Drips Per five test bars | UL-94 Rating |
|---|---|---|---|---|
| CONTROL | 86 | 26 | 13 | Burning |
| Potassium 2,5-dichlorothiophene-3-sulfonate | 84 | 3.6 | 0 | V-O |

EXAMPLE V

This example is set forth to demonstrate the effect of the additive of this invention at limits of 1.0 parts per hundred parts of the polycarbonate.

In preparing the test specimens for this Example, 100.00 parts of the polycarbonate of Example I is mixed with 1.0 parts of the additive listed in Table 5 employing the same procedure. Test specimens are then molded using the same procedure employed in Example I. The test specimens are subjected to the same test procedure of Example I with the following results:

TABLE 5

| Additive (1.0 parts per hundred) | Light Transmission (%) | Flame Out Time Seconds | No. of Drips Per five test bars | UL-94 Rating |
|---|---|---|---|---|
| CONTROL | 86 | 26 | 13 | Burning |
| Sodium 2,5-dichlorothiophene-3-sulfonate | 60 | 4.8 | 0 | V-O |

EXAMPLE VI

This Example is set forth to show the effect of a known commercially available flame retardant additive.

Example I is repeated except that in place of the additives employed therein, only 1 part decabromodiphenyl ether is used herein. The results obtained upon evaluating five test bars are the same as obtained for the Control shown in Table 1 above.

In the practice of this invention, aromatic carbonate polymers are rendered flame retardant by the addition of certain particular additives which are the metal salts of substituted and unsubstituted sulfonic acids of heterocyclic compounds and which includes mixtures of the various metal salt and the said heterocyclic compounds. The amount of the additives employed in the practice of this invention may vary from 0.001 to up to about 2.0 parts per hundred parts of aromatic carbonate polymer.

As indicated previously, the additive of the instant invention comprises the alkali or alkaline earth metal salts of the substituted and unsubstituted sulfonic acids of heterocyclic compounds and mixtures thereof. While a great number of such salts are set forth in the tables of the Examples of the instant invention, these are only a representative sample of the additives of this invention. The sodium, calcium, magnesium, potassium, strontium, lithium, barium, rubidium and cesium salts of other sulfonic acids of heterocyclic compounds can be employed in place of those of the Examples with the same effective flame retardancy being achieved. These other metal salts of sulfonic acids of heterocyclic compounds are:

trifluorothiophenesulfonic acid, calcium salt
thianaphtheneindeneindigodisulfonic acid, disodium salt
pyridine-3,5-disulfonic acid, dipotassium salt
tetrachlorodibenzopyrroledisulfonic acid, disodium salt
trichloroquinoline-8-sulfonic acid, lithium salt
octachlorocopperphthalocyaninetetrasulfonic acid, tetrasodium salt
tetrachlorothianthrenedisulfonic acid, barium salt
dichlorobenzothiazolesulfonic acid, sodium salt
3,4,5-trichlorothiophene-2-sulfonic acid, calcium salt
3,4-dichlorothiophene-2,5-disulfonic acid, disodium salt In the practice of this invention, the additive is generally prepared by well known methods in the art. For example, one such well known method involves taking the heterocyclic compound, such as thiophene, and contacting it with either of the electron withdrawing components such as through chlorination or nitration. This is then subjected to sulfonation using either sulfuric acid, chlorosulfonic acid, fuming sulfonic acid or sulfur trioxide. These reactions can be carried out at room temperature or at elevated temperatures such as about 50° C. Alternatively, the order of the above reaction can be reversed. The salt is then prepared by adding the proper alkaline reagent in sufficient amount to make the neutral salt. The salt is then recovered by precipitation or by distillation of the solvent.

In the case of the trihalomethyl electron withdrawing substituent, such as trifluoromethyl electron withdrawing substituent, it is best to start with the prepared trifluoromethyl heterocycle and then sulfonate as above, as well as preparing the salt thereof.

In the case of the cyano-substituent, it is best to prepare the sulfonic acid by oxidation of the corresponding thiophenol by hydrogen peroxide or organic peracids. The salt is then made as above and recovered accordingly. This technique is also best for the preparation of sulfonic acids with the trichloromethyl substituent.

In the practice of this invention, any of the aromatic polycarbonates can be employed herein having a refractive index in the range of 1.54 to 1.65. These are homopolymers and copolymers and mixtures thereof that are prepared by reacting a dihydric phenol with a carbonate precursor. Typical of some of the dihydric phenols that may be employed in the practice of this invention are bisphenol-A, (2,2-bis(4-hydroxyphenyl) propane), bis(4-hydroxyphenyl)methane, 2,2-bis(4-hydroxy-3-methylphenyl) propane, 4,4-bis(4-hydroxyphenyl)heptane, 2,2-(3,5,3′,5′-tetrachloro-4,4′-dihydroxydiphenyl)-propane, 2,2-(3,5,3′,5′-tetrabromo-4,4′-dihydroxydiphenyl)propane, (3,3′-dichloro-4,4′-dihydroxyphenyl) methane. Other dihydric phenols of the bisphenol type are also available and are disclosed in U.S. Pat. Nos. 2,999,835, 3,028,365 and 3,334,154.

It is, of course, possible to employ two or more different dihydric phenols or a copolymer of a dihydric phenol with a glycol or with hydroxy or acid terminated polyester, or with a dibasic acid in the event a carbonate copolymer or interpolymer rather than a homopolymer is desired for use in the preparation of the aromatic carbonate polymers of this invention. Also employed in the practice of this invention may be blends of any of the above materials to provide the aromatic carbonate polymer.

The carbonate precursor may be either a carbonyl halide, a carbonate ester of a haloformate. The carbonyl halides which can be employed herein are carbonyl bromide, carbonyl chloride and mixtures thereof. Typical of the carbonate esters which may be employed herein are diphenyl carbonate, di-(halophenyl) carbonates such as di-(chlorophenyl) carbonate, di-(bromphenyl) carbonate, di-(trichlorophenyl) carbonate, di-(tribromophenyl) carbonates, etc., di-(alkylphenyl) carbonates such as di(tolyl) carbonate, etc., di-(naphthyl) carbonate, di-(chloronaphthyl) carbonate, phenyl tolyl carbonate, chlorophenyl chloronaphthyl carbonate, etc., or mixtures thereof. The haloformates suitable for use herein include bis-haloformates of dihydric phenols (bischloroformates of hydroquinone, etc.) or glycols (bishaloformates of ethylene glycol, neopentyl glycol, polyethylene glycol, etc.). While other carbonate precursors will occur to those skilled in the art, carbonyl chloride, also known as phosgene, is preferred.

Also included are the polymeric derivatives of a dihydric phenol, a dicarboxylic acid and carbonic acid. These are disclosed in U.S. Pat. No. 3,169,121 which is incorporated herein by reference.

The aromatic carbonate polymers of this invention may be prepared by employing a molecular weight regulator, an acid acceptor and a catalyst. The molecular weight regulators which can be employed in carrying out the process of this invention include monohydric phenols such as phenol, chroman-I, paratertiarybutylphenol, parabromophenol, primary and secondary amines, etc. Preferably, phenol is employed as the molecular weight regulator.

A suitable acid acceptor may be either an organic or an inorganic acid acceptor. A suitable organic acid acceptor is a tertiary amine and includes such materials as pyridine, triethylamine, dimethylaniline, tributylamine, etc. The inorganic acid acceptor may be one which can be either a hydroxide, a carbonate, a bicarbonate, or a phosphate of an alkali or alkaline earth metal.

The catalysts which are employed herein can be any of the suitable catalysts that aid the polymerization of bisphenol-A with phosgene. Suitable catalysts include tertiary amines such as for example, triethylamine, tripropylamine, N,N-dimethylaniline, quaternary ammonium compounds such as, for example, tetraethylammonium bromide, cetyl triethyl ammonium bromide, tetra-n-heptylammonium iodide, tetra-n-propyl ammonium bromide, tetramethylammonium chloride, tetramethyl ammonium hydroxide, tetra-n-butyl-ammonium iodide, benzyltrimethylammonium chloride and quaternary phosphonium compounds such as, for example, n-butyl-triphenyl phosphonium bromide and methyltriphenyl phosphonium bromide.

Also, included herein are branched polycarbonates wherein a polyfunctional aromatic compound is reacted with the dihydric phenol and carbonate precursor to provide a thermoplastic randomly branched polycarbonate.

These polyfunctional aromatic compounds contain at least three functional groups which are carboxyl, carboxylic anhydride, haloformyl or mixtures thereof. Examples of these polyfunctional aromatic compounds which may be employed in the practice of this invention include: trimellitic anhydride, trimellitic acid, trimellityl trichloride, 4-chloroformyl phthalic anhydride, pyromellitic acid, pyromellitic dianhydride, mellitic acid, mellitic anhydride, trimesic acid, benzophenonetetracarboxylic acid, benzophenonetetracarboxylic anhydride and the like. The preferred polyfunctional aromatic compounds are trimellitic anhydride or trimellitic acid, or their haloformyl derivatives.

Also, included herein are blends of a linear polycarbonate and a branched polycarbonate.

It will thus be seen that the objects set forth above among those made apparent from the preceding description are efficiently attained and since certain changes may be made in carrying out the above process and in the composition set forth without departing from the scope of this invention, it is intended that all matters contained in the above description shall be interpreted as illustrative and not in a limiting sense.

What is claimed is:

1. A non-opaque flame retardant aromatic polymer composition comprising in admixture an aromatic carbonate polymer and from 0.001 to about 2.0 parts per hundred parts of the aromatic carbonate polymer of an additive selected from the group consisting of the metal salts of substituted and unsubstituted sulfonic acids of heterocyclic compounds, and mixtures thereof, wherein said metal salts thereof are selected from the group consisting of alkali metals and alkaline earth metals, and mixtures of the metal salts, and wherein said substituent on the metal salt of the substituted sulfonic acids of heterocyclic compounds is selected from the group consisting of an electron withdrawing radical and mixtures of electron withdrawing radicals; and wherein said heterocyclic compound is selected from the group consisting of five and six membered heterocyclic nuclei containing a hetero atom selected from the group consisting of nitrogen, oxygen and sulfur; said aromatic carbonate polymer and additive having a refractive index in the range of 1.54 to 1.65.

2. A shaped article having a refractive index in the range of 1.54 to 1.65 comprising in admixture an aromatic carbonate polymer and from 0.001 to about 2.0 parts per hundred parts of the aromatic carbonate polymer of an additive selected from the group consisting of the metal salts of substituted and unsubstituted sulfonic acids of heterocyclic compounds, and mixtures thereof, wherein said metal salts thereof are selected from the group consisting of alkali metals and alkaline earth metals, and mixtures of the metal salts, and wherein said substituent on the metal salt of the substituted sulfonic acids of heterocyclic compounds is selected from the group consisting of an electron withdrawing radical and mixtures of electron withdrawing radicals; and wherein said heterocyclic compound is selected from the group consisting of five and six membered heterocyclic nuclei containing a hetero atom selected from the group consisting of nitrogen, oxygen and sulfur.

3. The shaped article of claim 2 wherein the metal salts of substituted and unsubstituted sulfonic acids of heterocyclic compounds has the following formula:

wherein X is an electron withdrawing radical and M is a metal selected from the group consisting of alkali metal and alkaline earth metal and R is an organic nucleus selected from the group of organic heterocyclic nuclei consisting of:

A. 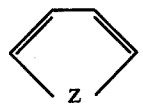

wherein Z is selected from the hetero atoms consisting of sulfur, oxygen and nitrogen, B. 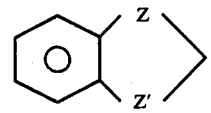

wherein Z and Z' are independently selected from the group consisting of carbon and the hetero atoms, nitrogen, sulfur and oxygen, providing that at least one Z is an hetero arom.

C. 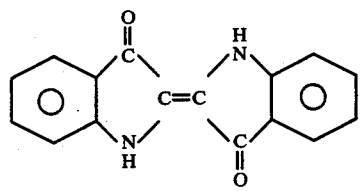

D. Phthalocyanine

E. 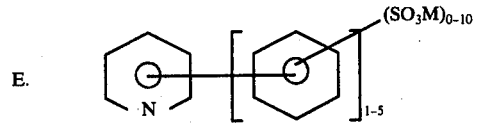

F. 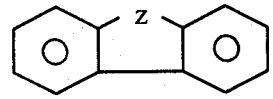

wherein Z is selected from the hetero atoms consisting of sulfur, oxygen and nitrogen.

4. The shaped article of claim 2 wherein the electron withdrawing radical is selected from the group consisting of halo-, nitro-, trihalomethyl- and cyano- radicals, and mixtures thereof.

5. The shaped article of claim 3 wherein the additive is sodium 2,5-dichlorothiophene-3-sulfonate.

6. The shaped article of claim 3 wherein the additive is sodium 2,6-dichloropyridine-3-sulfonate.

7. The shaped article of claim 3 wherein the additive is disodium indigo-5,5'-disulfonate.

8. The shaped article of claim 3 wherein the additive is tetrasodium copper phthalocyanine tetrasulfonate.

9. The shaped article of claim 3 wherein the additive is calcium 2,5-dichlorothiophene-3-sulfonate.

10. The shaped article of claim 3 wherein the additive is potassium, 2,5-dichlorothiophene-3-sulfonate.

11. The shaped article of claim 2 in the form of a sheet.

12. The shaped article of claim 2 in the form of a pellet.

UNITED STATES PATENT OFFICE
CERTIFICATE OF CORRECTION

Patent No. 4,039,509            Dated August 2, 1977

Inventor(s) Victor Mark

It is certified that error appears in the above-identified patent and that said Letters Patent are hereby corrected as shown below:

Col. 1, line 25, "criteria" is misspelled

Col. 4, line 45, add "inch" after "1/8"

Col. 7, line 52, after "chlorination" add -- , bromination --

*Signed and Sealed this*

*Twenty-ninth* Day of *November 1977*

[SEAL]

Attest:

RUTH C. MASON
*Attesting Officer*

LUTRELLE F. PARKER
*Acting Commissioner of Patents and Trademarks*